US011081733B2

(12) United States Patent
Wang et al.

(10) Patent No.: US 11,081,733 B2
(45) Date of Patent: Aug. 3, 2021

(54) INTELLIGENT BATTERY AND METHOD

(71) Applicant: SZ DJI TECHNOLOGY CO., LTD., Shenzhen (CN)

(72) Inventors: Lei Wang, Shenzhen (CN); Wentao Wang, Shenzhen (CN); Dayang Zheng, Shenzhen (CN); Bogao Xu, Shenzhen (CN); Hao Luo, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 1189 days.

(21) Appl. No.: 15/429,223

(22) Filed: Feb. 10, 2017

(65) Prior Publication Data
US 2017/0155174 A1 Jun. 1, 2017

Related U.S. Application Data

(63) Continuation of application No. PCT/CN2015/100205, filed on Dec. 31, 2015.

(51) Int. Cl.
*H01M 10/42* (2006.01)
*H01M 10/48* (2006.01)
*H01M 2/10* (2006.01)
*H01M 50/20* (2021.01)

(52) U.S. Cl.
CPC ..... *H01M 10/4221* (2013.01); *H01M 10/425* (2013.01); *H01M 10/482* (2013.01); *H01M 50/20* (2021.01); *H01M 2010/4271* (2013.01); *H01M 2220/20* (2013.01)

(58) Field of Classification Search
CPC ........... H01M 10/4221; H01M 2/1077; H01M 10/425; H01M 10/482; H01M 2010/4271; H01M 2220/20
See application file for complete search history.

(56) References Cited

U.S. PATENT DOCUMENTS

| 2012/0105001 A1* | 5/2012 | Gallegos | H02J 7/0027 320/109 |
|---|---|---|---|
| 2013/0113429 A1* | 5/2013 | Kim | H02J 7/0031 320/128 |
| 2013/0288530 A1 | 10/2013 | Zhao | |
| 2014/0253046 A1* | 9/2014 | Poznar | H01M 10/615 320/136 |
| 2014/0342193 A1* | 11/2014 | Mull | H01M 10/4257 429/50 |
| 2015/0037649 A1 | 2/2015 | Wyatt et al. | |
| 2015/0160641 A1 | 6/2015 | Jung | |
| 2016/0226108 A1* | 8/2016 | Kim | H01M 10/0525 |

FOREIGN PATENT DOCUMENTS

| CN | 2665945 Y | 12/2004 |
|---|---|---|
| CN | 101420036 A | 4/2009 |
| CN | 101752617 A | 6/2010 |
| CN | 103299473 A | 9/2013 |
| CN | 103887840 A | 6/2014 |
| CN | 104467196 A | 3/2015 |
| CN | 204424334 U | 6/2015 |
| CN | 105103402 A | 11/2015 |

OTHER PUBLICATIONS

The World Intellectual Property Organization (WIPO) International Search Report and Written Opinion for PCT/CN2015/100205 dated Oct. 9, 2015 10 Pages.

* cited by examiner

*Primary Examiner* — Muhammad S Siddiquee
(74) *Attorney, Agent, or Firm* — Anova Law Group, PLLC

(57) ABSTRACT

An intelligent battery system and methods for making and using the same are provided. The intelligent battery system can halve a pack of cells and a battery management system. ("BMS") for providing secondary protection for the pack of cells. The pack of cells can comprise cells with operating parameters such as capacities, voltages, currents, charge/discharge rates and/or lifecycles that are uniform, or different, among the cells. The BMS can comprise a gas gauge, a microcontroller and a MOS switch circuit for managing the pack of cells and providing the secondary protection based on chemical characteristics of the cells and operating parameters of the cells. The intelligent battery system advantageously can include cells that are replaceable. For purposes of storage and/or transportation an of the cells can be dissembled and assembled without affecting the capacity and performance of the intelligent battery.

19 Claims, 13 Drawing Sheets

[Fig. 1]
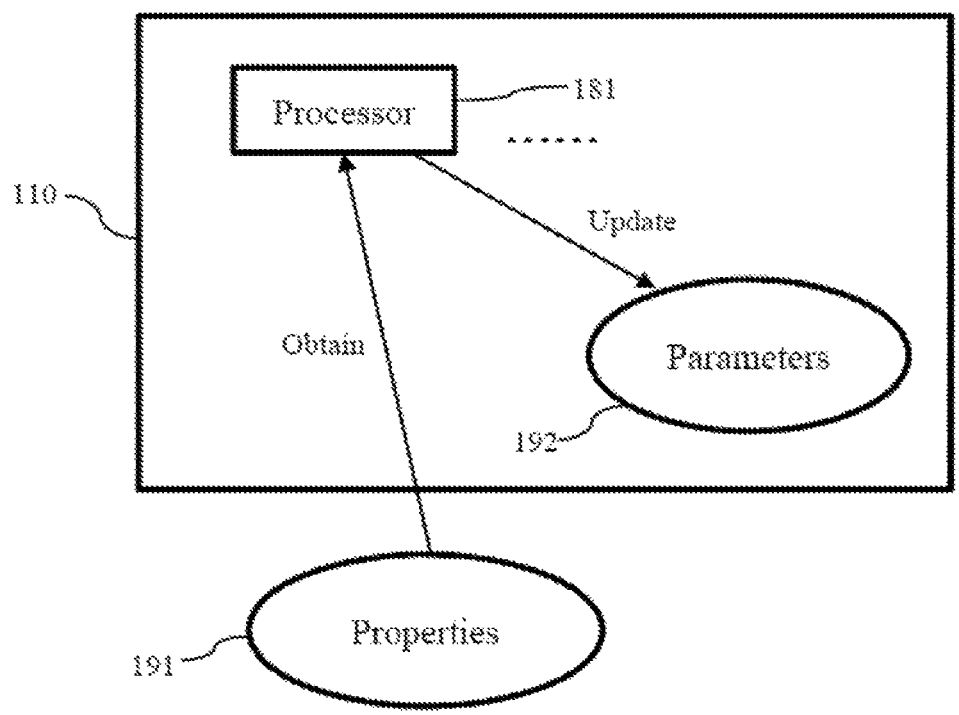

[Fig. 2]
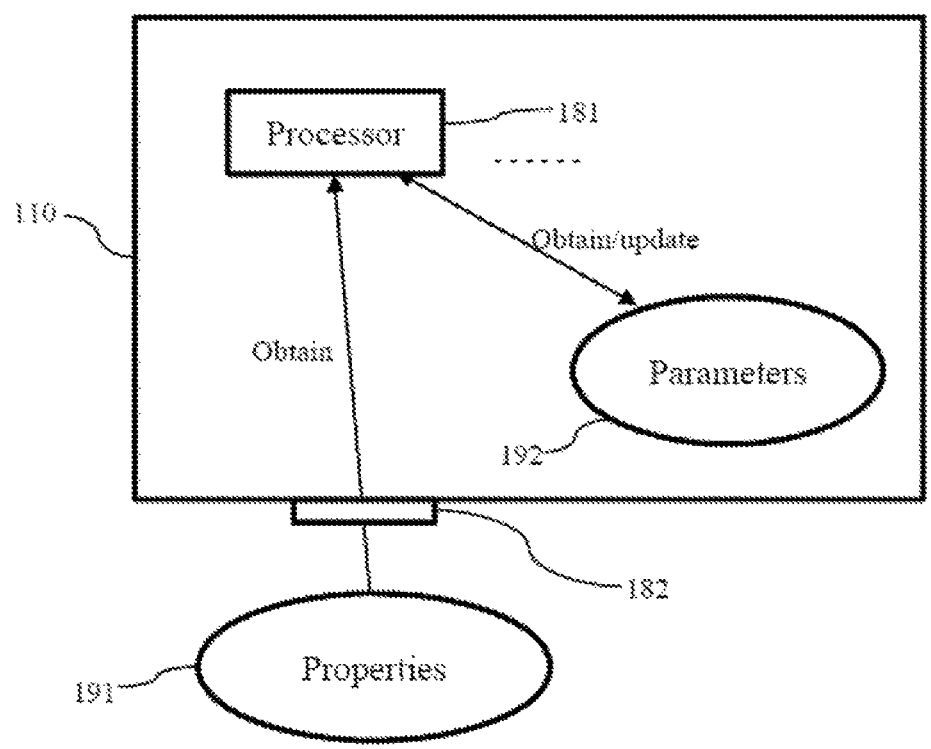

[Fig. 3]
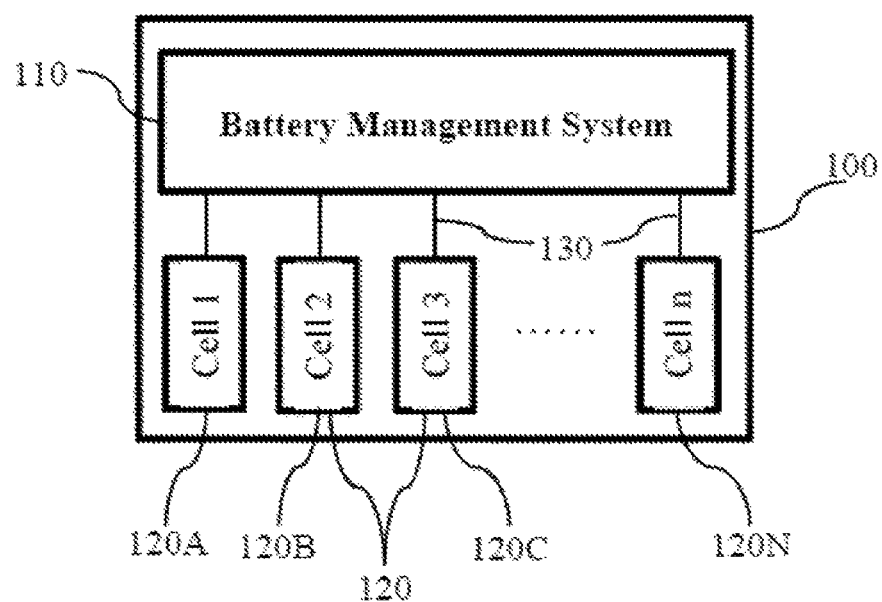

[Fig. 4]
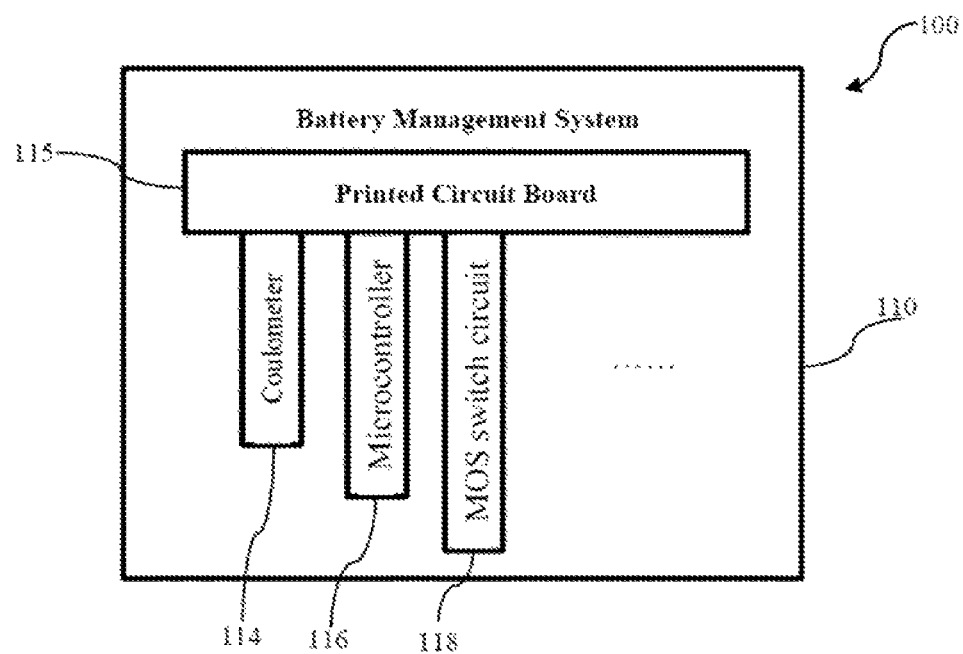

[Fig. 5]
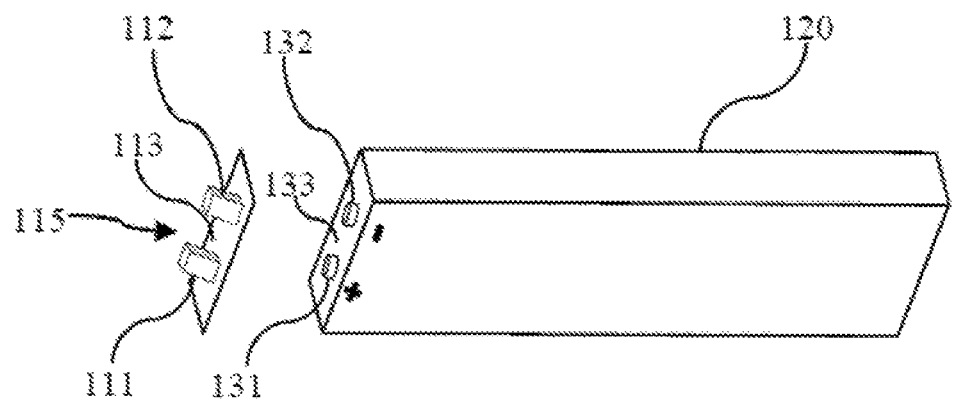

[Fig. 6]
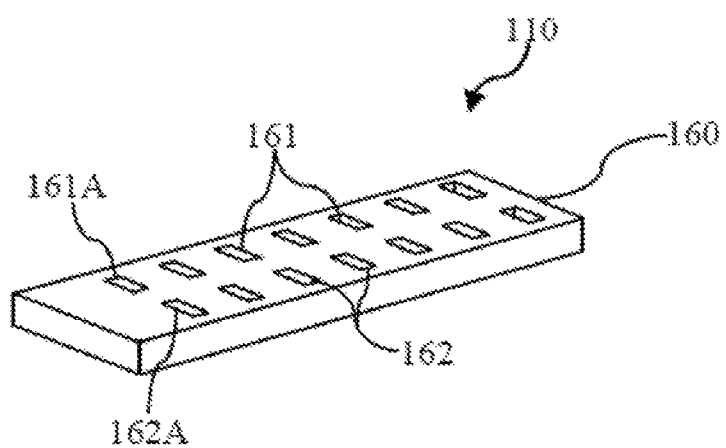

[Fig. 7]
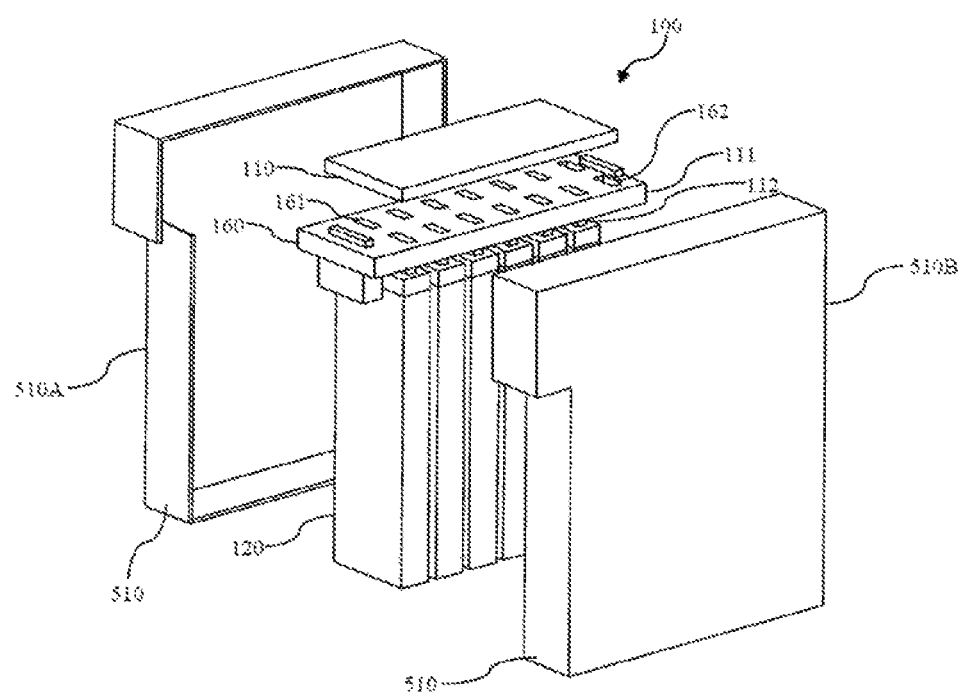

[Fig. 8]
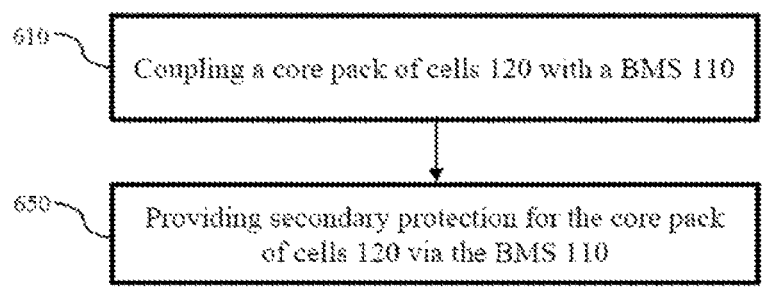

[Fig. 9]
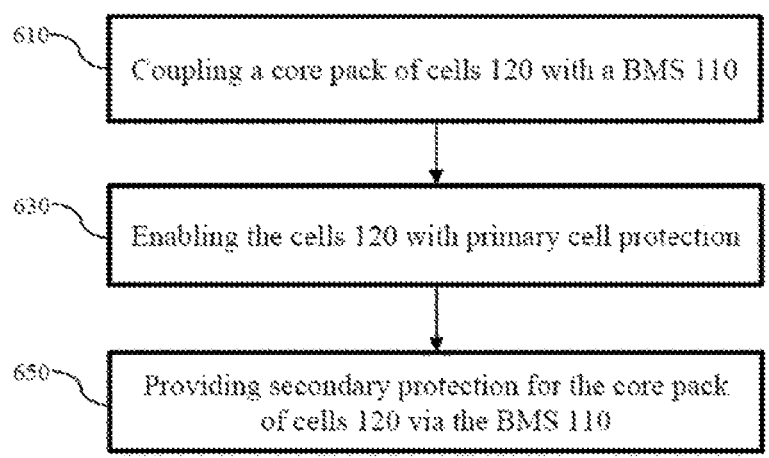

[Fig. 10]
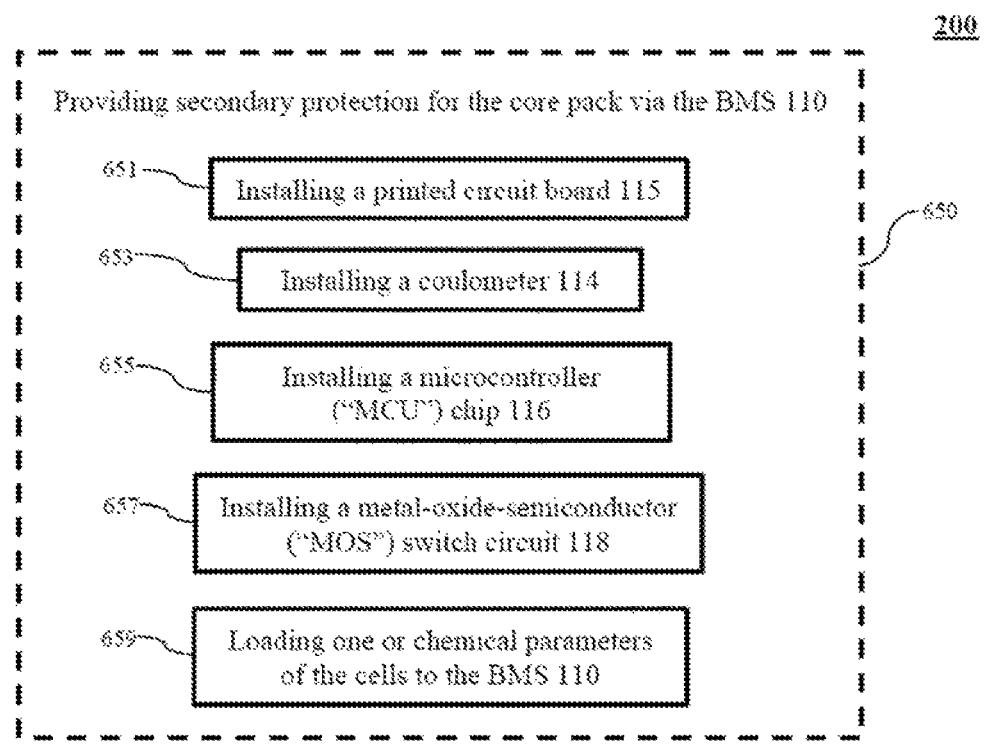

[Fig. 11]
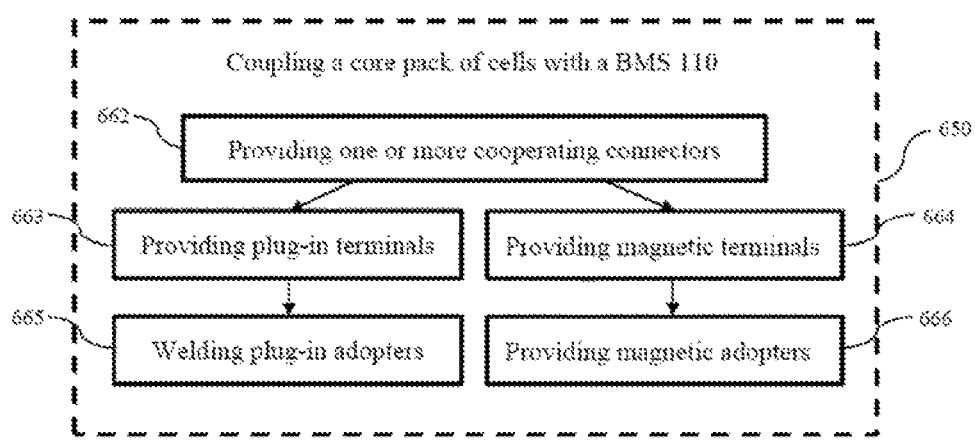

[Fig. 12]
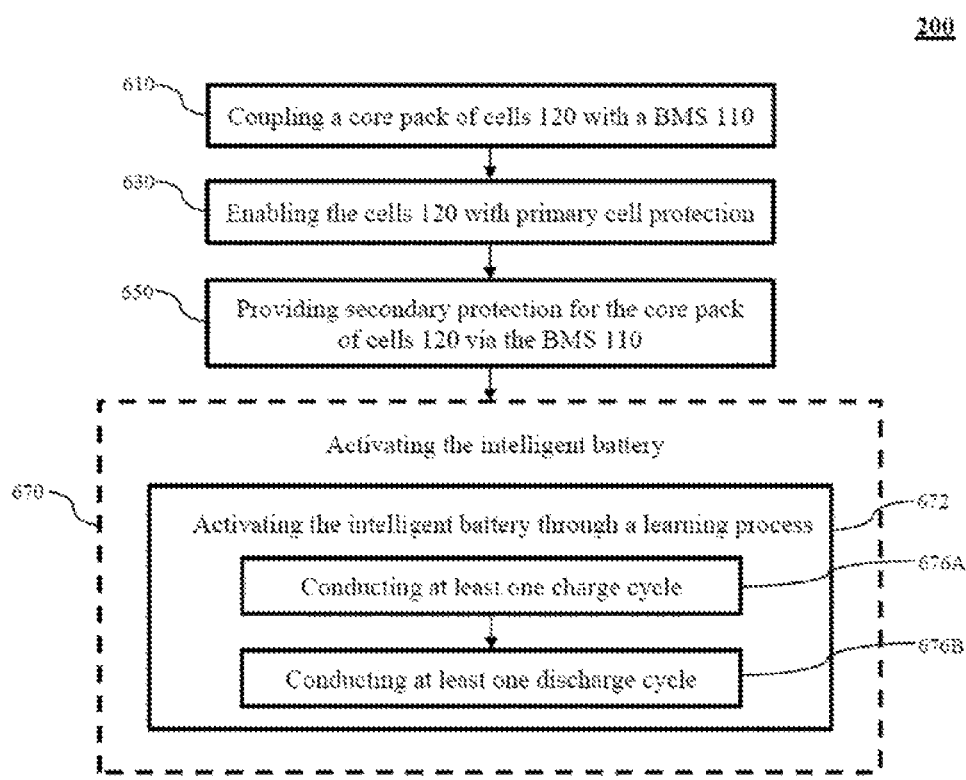

[Fig. 13]
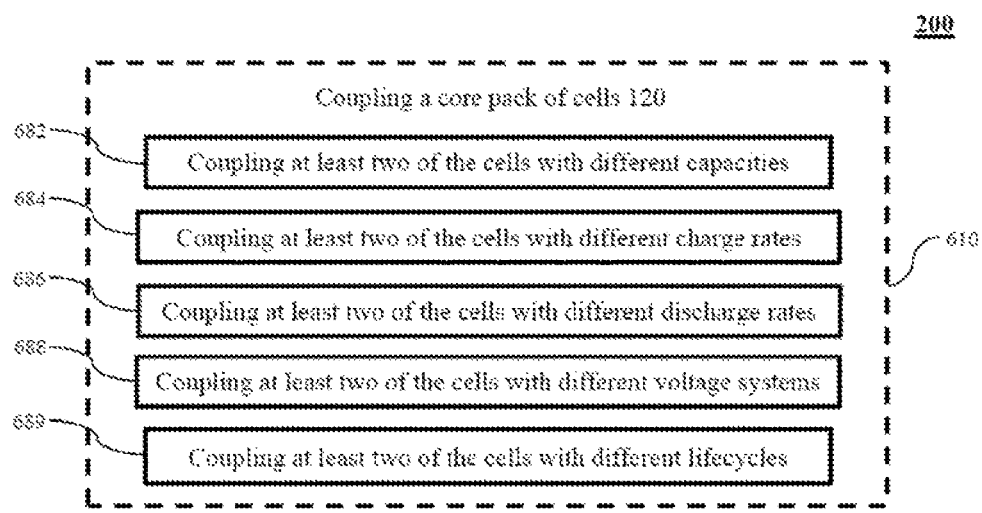

INTELLIGENT BATTERY AND METHOD

CROSS-REFERENCE TO RELATED APPLICATION

This is a continuation application of International Application No. PCT/CN2015/100205, filed on Dec. 31, 2015, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to batteries and more particularly, but not exclusively, to intelligent battery systems and methods with secondary protection.

BACKGROUND

An assembled battery basically consists of multiple battery cells and a battery integration board. Currently-available assembled batteries require strict matching among the cells and the integration board according to application requirements to form an indivisible integrated battery, such as voltage, current and charge rate.

Because the battery integration board and the cells are strictly matched in a currently-available assembled battery, both capacity and parameters of the battery are required to be fixed. The capacity and the parameters cannot be adjusted based on the application requirements. In addition, when one of the cells malfunctions, the entire intelligent battery loses effectiveness and can no longer be used. Moreover, when the capacity of the assembled battery is greater than one hundred watts per hour, the battery cannot easily be transported.

In view of the foregoing reasons, there is a need for an intelligent battery system and method for incorporating battery cells with various capacities and/or various systems.

SUMMARY

In accordance with a first aspect disclosed herein, there is set forth a battery management system ("BMS"), comprising:
one or more processors, individually or collectively, configured to:
  obtain at least one property of a pack of cells; and
  update at least one controlling parameter of the BMS, based on the property, for protecting the pack of cells.

Exemplary embodiments of the disclosed system further comprise an interface for communicating to the processors.

In an exemplary embodiment of the disclosed systems, the processors are configured to obtain the property of the pack of cells via the interface.

In another exemplary embodiment of the disclosed systems, the interface comprise one or more cooperating terminals for releasably coupling the BMS with the pack of cells.

In an exemplary embodiment of the disclosed systems, the at least one property of the pack of cells comprises at least one of a chemical characteristic of the pack of cells in the pack, a number of cells, and an electrical connection between the cells.

In an exemplary embodiment of the disclosed systems, the at least one controlling parameter comprises at least one of a battery parameter, a protection parameter, a voltage level, a current level, a power level, a lifecycle, and a temperature level.

In an exemplary embodiment of the disclosed systems, the processors comprises a microcontroller ("MCU") chip and a gas gauge.

Exemplary embodiments of the disclosed systems further comprise a first storage device for storing a plurality of predetermined properties of the pack of cells.

In an exemplary embodiment of the disclosed systems, the processors are configured to recognize a type of each of the cells and elect the predetermined properties based on the type.

In an exemplary embodiment of the disclosed systems, each of the cells comprises a second storage device configured to store the property of the cell.

In an exemplary embodiment of the disclosed systems, each of the processors are configured to obtain the property of the cell when the processor is coupled with the cell.

In accordance with another aspect disclosed herein, there is set forth an intelligent battery, comprising:
a pack of cells; and
a battery management system ("BMS") configured to obtain at least one property of a pack of cells and update at least one controlling parameter of the BMS based on the property of the cells.

In an exemplary embodiment of the disclosed intelligent battery, the pack of cells provides primary battery protection for the cells, and wherein the BMS provides secondary protection for the cells.

In another exemplary embodiment of the disclosed intelligent batteries, the BMS is adapted to releasably couple with the pack of cells.

Exemplary embodiments of the disclosed intelligent batteries further comprise an interface for communicating to the processors.

In another exemplary embodiment of the disclosed intelligent batteries, the processors are configured to obtain the property of the pack of cells via the interface.

In another exemplary embodiment of the disclosed intelligent batteries, the property of the pack comprises at least one of a chemical characteristic of the pack of cells, a number of cells in the pack, a type of any of the cells, an electrical connection between the cells, and a status of any of the cells.

In another exemplary embodiment lithe disclosed intelligent batteries, the controlling parameters comprise at least one of a battery parameter, a protection parameter, a voltage level, a current level, a power level, a lifecycle, and a temperature level.

In another exemplary embodiment of the disclosed intelligent batteries, the processors comprises a microcontroller, ("MCU") chip and a gas gauge.

Exemplary embodiments of the disclosed intelligent batteries further comprise at least one first storage device for storing a plurality of predetermined properties of the pack of cells.

In another exemplary embodiment of the disclosed intelligent batteries, the processors are configured to recognize a type of each of the cells and elect the predetermined properties based on the type.

In another exemplary embodiment of the disclosed intelligent batteries, each of the cells comprises a second storage device configured to store the property of the cell.

In another exemplary embodiment of the disclosed intelligent batteries, each of the processors are configured to obtain the property of the cell when the processor is coupled with the cell.

In another exemplary embodiment of the disclosed intelligent batteries, the gas gauge is configured to measure a battery status of the intelligent battery.

In another exemplary embodiment of disclosed intelligent batteries, the battery status includes at least one of the battery parameter, the protection parameter, the voltage level, the current level, the power level, the lifecycle, and the temperature level.

In another exemplary embodiment of the disclosed intelligent batteries, the BMS comprises a metal-oxide-semiconductor ("MOS") switch circuit for switching on and off a selected cell of the pack.

In another exemplary embodiment of the disclosed intelligent batteries, the interface comprises one or more cooperating terminals for releasably coupling the BMS with the pack of cells.

In another exemplary embodiment of the disclosed intelligent batteries, the cooperating terminals comprise mechanical plug-in type terminals.

In another exemplary embodiment of the disclosed intelligent batteries, the selected cell of the pack comprises a plug-in connector for cooperating with one or more of the terminals.

In another exemplary embodiment of the disclosed intelligent batteries, the plug-in connector is welded with one or more lugs of the selected cell.

In another exemplary embodiment of the disclosed intelligent batteries, the cooperating terminals are of a magnetic type.

In another exemplary embodiment of the disclosed intelligent batteries, each of the cells comprises a magnetic adhesive connector with contacts for cooperating with the cooperating terminals.

In another exemplary embodiment of the disclosed intelligent batteries, the connector is welded to one or more lugs of the cell.

In another exemplary embodiment of the disclosed intelligent batteries, at least one of the cells is replaceable.

In another exemplary embodiment of the disclosed intelligent batteries, each of the cells is replaceable.

In another exemplary embodiment of the disclosed intelligent batteries, at least one of the cells is detachable from the BMS.

In another exemplary embodiment of the disclosed intelligent batteries, each of the cells is detachable from the BMS.

In another exemplary embodiment of the disclosed intelligent batteries, each of the cells is detachable by unplugging the relevant cell from the BMS.

In another exemplary embodiment of the discloser intelligent batteries, the intelligent battery is activated through a learning process.

In another exemplary embodiment of the disclosed intelligent batteries, the learning process comprises at least one of a charge cycle and a discharge cycle.

In another exemplary embodiment of the disclosed intelligent batteries, at least two of the cells have various capacities.

In another exemplary embodiment of the disclosed intelligent batteries, at least two of the cells have various discharge rates.

In another exemplary embodiment of the disclosed intelligent batteries, at least two of the cells have various voltage levels.

In another exemplary embodiment of the disclosed intelligent batteries, at least two of the cells have various lifecycles.

Exemplary embodiments of the disclosed intelligent batteries further comprise a housing for enclosing the cells and the BMS.

In accordance with another aspect disclosed herein, there is set, forth, a method for manufacturing an intelligent battery, comprising:

configuring a battery management system ("BMS") to obtain at least one property of pack of cells, and update at least one controlling parameter of the BMS based on the property of the cells.

In an exemplary embodiment of the disclosed method, configuring the BMS comprises configuring the BMS to provide secondary protection for the pack of cells with primary battery protection.

In another exemplary embodiment of the disclosed methods, configuring the BMS comprises releasably coupling the BMS with the pack of cells.

In another exemplary embodiment of the disclosed methods, configuring comprises providing an interface for communicating to the processors.

In another exemplary embodiment of the disclosed methods, configuring comprises obtaining the property of the pack of cells via the interface.

In another exemplary embodiment of the disclosed methods, obtaining the property comprises acquiring at least one of a chemical characteristic of the pack of cells, a number of cells in the pack, a type of any of the cells, an electrical connection between the cells, and a status of any of the cells.

In another exemplary embodiment of the disclosed methods, updating the controlling parameter comprises changing at least one of a battery parameter, a protection parameter, a voltage level, a current. level, a power level, a lifecycle, and a temperature level.

In another exemplary embodiment of the disclosed methods, configuring the processors comprises constructing the processors with a microcontroller ("MCU") chip and a gas gauge.

In another exemplary embodiment of the disclosed methods, configuring the processors comprises providing at least one first storage device for storing, a plurality of predetermined properties of the pack of cells.

In another exemplary embodiment of the disclosed methods, configuring the processors comprises configuring the processors to recognize a type of each of the cells and elect the predetermined properties based on the type.

In another exemplary embodiment of the disclosed methods, coupling the cells comprises coupling the cells with a second storage device configured to store the property of the cell.

In another exemplary embodiment of the disclosed methods, configuring the processors comprises configuring, the processors to obtain the property of the cell when the processor is coupled with the cell.

In another exemplary embodiment of the disclosed methods, constructing comprises configuring the gas gauge for measuring a status of the intelligent battery.

In another exemplary embodiment of the disclosed methods, measuring the status comprises measuring at least one of a battery parameter, a protection parameter, a voltage, a current, a power level, a lifecycle, and/or a temperature level.

In another exemplary embodiment of the disclosed methods, providing secondary protection comprises installing a microcontroller ("MCU") chip.

In another exemplary embodiment of the disclosed methods, providing secondary protection comprises installing a metal-oxide-semiconductor ("MOS") switch circuit for switching on and off a selected cell of he pack.

In another exemplary embodiment of the disclosed methods, providing the interface comprises providing one or more cooperating terminals for releasably coupling the BMS with the pack of cells.

In another exemplary embodiment of the disclosed methods, providing the cooperating terminals comprises providing mechanical plug-in terminals.

In another exemplary embodiment of the disclosed methods, coupling the cells comprises welding a plug-in connector to one or more lugs of the selected cell for cooperating with the mechanical plug-in terminals.

In another exemplary embodiment of the disclosed methods, providing the cooperating terminals comprises providing magnetic terminals.

In another exemplary embodiment of the disclosed methods, coupling the cells comprises welding a magnetic adhesive connector to one or more lugs of the selected of the cells for cooperating with the magnetic terminals.

In another exemplary embodiment of the disclosed methods, coupling the cells comprises enabling at least one of the cells to be replaceable.

In another exemplary embodiment of the disclosed methods, coupling the cells comprises enabling each of the cells to be replaceable.

In another exemplary embodiment of the disclosed methods, coupling the cells comprises enabling at least one of the cells to be detachable from the BMS.

In another exemplary embodiment of the disclosed methods, coupling the cells comprises enabling each of the cells to be detachable from the BMS.

Exemplary embodiments of the disclosed methods further comprise activating the intelligent battery.

In another exemplary embodiment of the disclosed methods, activating comprises activating the intelligent battery through a learning process.

In another exemplary embodiment of the disclosed methods, the learning process comprises at least one of a charge cycle and a discharge cycle.

In another exemplary embodiment of the disclosed methods, coupling the cells comprises coupling the cells with various capacities.

In another exemplary embodiment of the disclosed methods, coupling the cells comprises coupling at least two of the cells with various discharge rates.

In another exemplary embodiment of the disclosed methods, coupling the cells comprises coupling at least two of the cells with various voltage levels.

In another exemplary embodiment of the disclosed methods, coupling the cells comprises coupling at least two of the cells with various lifecycles.

Exemplary embodiments of the disclosed methods further comprise enclosing the cells and the BMS with a housing.

Exemplary embodiments of the disclosed methods further comprise reconfiguring the BMS.

In another exemplary embodiment of the disclosed methods, reconfiguring detaching the BMS from the pack of cells.

In another exemplary embodiment of the disclosed methods, reconfiguring further comprises changing at least one property of the pack of cells.

In another exemplary embodiment of the disclosed methods, reconfiguring further comprises recoupling the BMS with the pack of cells.

In another exemplary embodiment of the disclosed methods, reconfiguring further comprises updating at least one controlling parameter of the BMS based on the property of the pack of cells.

In another exemplary embodiment of the disclosed methods, changing the property comprises changing at least one of the chemical characteristic of the pack of cells, the number of the cells, the type of the cells, the electrical connection between the cells and the status of the cells.

In another exemplary embodiment of the disclosed methods, updating the controlling parameter comprises updating at least one of the battery parameter, the protection parameter, the voltage level, the current level, the power level, the lifecycle, and the temperature level.

BRIEF DESCRIPTION OF THE DRAWINGS

FIG. 1 is an exemplary block diagram illustrating an embodiment of a Battery Management System ("BMS"), wherein the BMS consists of at least one processor for updating controlling parameters of the BMS.

FIG. 2 is an exemplary block diagram illustrating an alternative embodiment of the BMS of FIG. 1, wherein the BMS uses an interface for obtaining properties of a pack of cells in order to update the controlling parameters of the BMS.

FIG. 3 is an exemplary top-level block diagram illustrating an embodiment of an intelligent battery consisting of the BMS of FIG. 1 coupled with a pack of cells.

FIG. 4 is an exemplary block diagram illustrating an alternative embodiment of the BMS of FIG. 1, wherein the BMS consists of a printed circuit board, a gas gauge, a microcontroller ("MCU") and a metal-oxide-semiconductor ("MOS") switch circuit.

FIG. 5 is an exemplary block diagram illustrating an embodiment of a cell included in the intelligent battery of FIG. 3, wherein the cell has two electrode tabs.

FIG. 6 is an exemplary block diagram illustrating an embodiment of the BMS of FIG. 1, wherein the BMS includes a connection board for coupling with the pack of cells.

FIG. 7 is a detail diagram illustrating another alternative embodiment of the intelligent battery of FIG. 3, wherein the intelligent battery is assembled within a housing.

FIG. 8 is an exemplary top-level flow chart illustrating an embodiment of method for manufacturing the intelligent battery of FIG. 3.

FIG. 9 is an exemplary flow chart illustrating an alternative embodiment of the method of FIG. 8, wherein the pack of cells is enabled with certain primary cell protection.

FIG. 10 is an exemplary flow chart illustrating another alternative embodiment of the method of FIG. 8, wherein providing secondary protection includes installing a printed circuit board, a gas gauge, an MCU chip and a MOS switch circuit.

FIG. 11 is an exemplary flow chart illustrating another alternative embodiment of the method of FIG. 8, wherein connectors and/or cooperating terminals are provided between the pack of cells and the BMS.

FIG. 12 is an exemplary flow chart illustrating another alternative embodiment of the method of FIG. 8, wherein the intelligent battery is activated by a learning process.

FIG. 13 is an exemplary flow chart illustrating another alternative embodiment of the method of FIG. 8, wherein various cells are coupled to the BMS to form the intelligent battery.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE EMBODIMENTS

Since currently-available assembled batteries require strict matching among the cells, depend upon the reliability of the individual cells and are difficult to transport, an intelligent battery system that does not need strict matching, remains effective when cells malfunction and is easy to transport can prove desirable and provide a basis for providing intelligent batteries for mobile platforms, such as Unmanned Aerial Vehicles ("UAVs"). This result can be achieved, for example, according to one embodiment of an intelligent battery 100 as illustrated in FIG. 1.

FIG. 1 illustrates a Battery Management System ("BMS") 110 of an intelligent battery 100 (shown in FIG. 3), consisting of one or more processors 181 that can work individually or collectively to manage the intelligent battery 100. In FIG. 1, the processors 181 can obtain at least one cell property 191 of a pack of cells 120 (show in FIG. 3) from the pack that will be described in more detail with reference to FIG. 3. In some embodiments, the properties 191 of the pack of cells 120 can comprise at least one of a chemical characteristic of the pack of cells 120, a number of the cells, and an electrical connection between the cells 120.

In some embodiments, one or more of the properties 191 of the pack of cells 120 can be identified by the processors 181. In some other embodiments, one or more of the properties 191 can be made available with the pack of cells 120, e.g., stored in a storage (not shown) of the pack of cells 120, which can be accessible by the processors 181. A manufacturer of the pack of cells 120 can preload the storage with the properties 191 of the pack of cells 120, such as the chemical characteristics, the number of the cells, and the electrical connection, which properties 191 can be obtained by the BMS 110 when coupled with the pack of cells 120. More detail regarding the properties 191 of the cells 120 will be provided below with reference to FIG. 3.

Although shown and described as obtaining the properties 191 of the pack of cells 120, the BMS 110 can obtain other information of the cells 120 and/or the intelligent battery 100, such as condition measurements of the cells 120 as shown and described with reference to FIG. 4. Although shown and described as obtaining the properties 191 from the pack of cells 120 for purposes of illustration only, the BMS 110 can acquire the properties 191 from any suitable sources, such as a storage inside or outside of the pack of cells 120.

The BMS 110 can include one or more controlling parameters 192 for controlling or managing the intelligent battery 100. The processors 181 of the BMS 110 can update at least one of the controlling parameters 192 based on the properties 191 of the pack of cells 120. In some embodiments, the controlling parameters 192 can include at least one of a battery parameter, a protection parameter, a voltage level, a current level, a power level, a lifecycle, and a temperature level. More detail regarding the controlling parameters 192 will be provided herein.

Although shown and described as being able to update the controlling parameters 192 for purposes of illustration only, the BMS 110 can provide controlling and/or managing functionalities to the pack of cells 120 and/or the intelligent battery. Such functionalities can include, e.g., switching on and/or off any cells 120. More detail regarding functionalities of the BMS 110 will be provided below with reference to FIG. 3.

In some exemplary embodiments, the BMS 110 can include an interface 182 for coupling and/or communicating with the pack or cells 120, as shown with reference to FIG. 2. Turning to FIG. 2, the interface 182 can comprise one or more cooperating terminals 115 (shown in FIG. 5) and can be used to releasably coupling the BMS 110 with the pack of cells 120. The BMS 110 can communicate with the pack of cells 120 through the interface 182 for obtaining the properties 191 of the pack of cells 120. More detail regarding the interface 182 and/or the cooperating terminals 115 will be provided with reference to FIGS. 5-7.

Although shown and described as using the interface 182 for communicating between the BMS 110 and the pack of cells 120 for purposes of illustration only, other suitable interfaces can also be used, e.g., any releasably conductive connections between the BMS 110 and the pack of cells 120.

In some alternative embodiments, in FIG. 2, the processors 181 can obtain both the properties 191 of the pack of cells 120 and the controlling parameters 192 for executing controlling and/or managing functions of the intelligent battery 100. Alternatively or additionally, as described herein, the BMS 110 can acquire the condition measurements of the cells 120 and/or the intelligent battery 100, while the intelligent battery 100 is under operation. The BMS 110 can execute the controlling/managing functionalities according to the condition measurements and/or the controlling parameters.

FIG. 3 shows an intelligent battery consisting of the BMS 110 and a pack of cells 120 (or a core pack) coupled with the BMS 110. The pack of cells 120 can include any predetermined number n of individual cells 120A-120N. In FIG. 3, the pack of cells 120A-120N can provide electrical power to a device or other load (not shown) that is connected to the intelligent battery 100. In some embodiments, the cells 120 optionally can provide primary protection to the cells 120 against predetermined operation situations of the cells 120. The intelligent battery 100 can also enable the BMS 110 to provide selected secondary protection to the cells 120 and/or to the intelligent battery 100 based on controlling parameters 192 (show in FIGS. 1 and 2) of the BMS 110. The primary and secondary protections will be discussed in more detail below with reference to FIGS. 4 and 5, respectively.

Each of the cells 120 can contain two electrodes and electrolyte not shown), a substance that reacts chemically with each electrode for generating an electrical current, for providing the electrical current to the electrodes. The cells 120 can be chargeable and/or rechargeable. The cells 120 can be any type of commercially-available cells, including, but not limited to, lead-acid cells, lithium air cells, lithiumion cells, nickel-cadmium cells, nickel-metal hydrogen cells and the like. In FIG. 3, each of the cells 120 can be connected (or coupled) with the BMS 110 via the interface 182 (shown in FIG. 2), including, but not limited to, any conductive connections 130, e.g., an electrical connection. Alternatively or additionally, each of the cells 120 can connect to one or more of the other cells 120 through same type of connections. The connections 130 can connect the electrodes of the cells 120 with the BMS 110. The connections 130 will be discussed with additional detail with reference to FIG. 4.

The BMS 110 can provide a platform to integrate the cells 120 to form the intelligent battery 100. As shown and described with reference to FIG. 1, the BMS 110 can obtain the properties 191 from the pack of cells 120 and update the controlling parameters 192 based on the properties 191. In some embodiments, the BMS 110 can measure conditions of the cells 120 (and/or the battery 100 as a whole) and/or control operation of the cells 120 based on the measured conditions and the controlling parameters 192. With the control of the BMS 110, the intelligent battery 100, for example, can switch the cells 120 on and/or off, etc. When measurement and/or control of the battery 100 involves multiple components, the BMS 110 can have a printed circuit board 112 that connects to each of the components. Detail of the BMS 110 is shown and described with reference to FIGS. 1, 2 and 4.

Although shown and described as having the BMS 110 and the cells 120 for purposes of illustration only, the intelligent battery 100 can contain other components for battery functions, e.g. mechanisms for securing the cells 120 and/or the BMS 110 and battery terminals for external connections.

FIG. 4 shows another exemplary embodiment of the BMS 110 of the intelligent battery 100 (collectively shown in FIGS. 1-3). Turning to FIG. 4, the BMS 110 can comprise a printed circuit board 115, a gas gauge 114, a microcontroller ("MCU") 116 and a metal-oxide-semiconductor ("MOS") switch circuit 118. In FIG. 4, the printed circuit board 115 can be a motherboard of the BMS 110 for integrating other components to form the BMS 110. The printed circuit board 115 can be a commercially-available printed circuit board, of any suitable kind. In some embodiments, the printed circuit board 115 can be used as the connection board 160 (or the interface 182) for adapting a plurality of cells 120 to form the intelligent battery 100 of a desired capacity and configuration. Alternatively or additionally, the printed circuit board 115 can be separated with the connection board 160. Although shown and described as having the printed circuit board 115, the coulometer 114, the MCU 116 and the MOS switch circuit 118, the BMS 110 can have other components for purposes described herein. In some embodiments, the gas gauge 114 can be a, for example, a coulometer.

The printed circuit board 115 can have sockets for adapting various integrated circuit chips for performing various functionalities. In some embodiments, the BMS 110 can comprise the gas gauge 114 far taking various measurements of the cells 120 and/or the intelligent battery 100, e.g., parameters related to voltage/current protections. Such measurements can include, but are not limited to, a voltage, a current, a capacity, a lifecycle, a temperature and/or similar parameters of the cell 120. The parameters can be used by, e.g., the MCU 116 to determine status for each cell 120, such as whether the cell 120 is still effective. In some embodiments, the gas gauge 114 can also be used to store related parameters for each cell 120.

The gas gauge 114 can be any commercially available gas gauge with a capacity of measuring parameters of the cells 120 and/or the intelligent battery 100, e.g., a coulometer. The parameters can comprise a current, a voltage, a power capacity, a temperature, a lifecycle and the like.

In other embodiments, the BMS 110 can have a microcontroller 116 that can be connected with the printed circuit board 115. The microcontroller 116 can be a small computer, commercially available from a market, on a single integrated circuit ("IC") containing one or more processors 181 (shown in FIGS. 1 and 2), a memory and programmable input/output peripherals. In some exemplary embodiments, the microcontroller 116 can have a plurality of pins for connection with the printed circuit board 115. The pins can be deliberately broken, after connected to the printed circuit board 115, to protect software burned into the memory or be unbroken to let a user to change the software burned into the memory.

The microcontroller 116 can commit any calculations and/or operations for managing the cells 120 and/or the battery 100 as a whole, including, but not limited to, a secondary protection to the cells 120. The secondary protection can include, but is not limited to, power breaking, alarm, security and other functions of the battery 100 and or the cells 120.

The microcontroller 116 can obtain the cell properties 191 from the pack of cells 120 and update the controlling parameters 192, as shown and described with reference to FIGS. 1 and 2. In some embodiments, the microcontroller 116 can store cell information of each of the cells 120, such as the cell properties 191 and the controlling parameters 192. The cell properties 191 can comprise, among other properties 191 described herein, chemical characteristics (or properties) of each of the cell 120. The chemical characteristics can be uniform and/or various among the cells 120. In some embodiments, the chemical characteristics of the cells 120 can be various among cells with various types. Manufacturers of the cells 120 typically provide the chemical characteristics with the cells 120. The chemical characteristics can be loaded (or burned) into the memory of the microcontroller 116 for providing bases for managing and/or protecting the cells 120 and the battery 100. Alternatively or additionally, the chemical characteristics can be loaded into the gas gauge 114 for same purposes of managing and/or protecting the cells 120 and the battery 100.

The BMS 110 can also comprise the MOS switch circuit 118 for switching on and/or off each of the cells 120 and for arranging the cells 120 in certain parallel and/or serial connected circuits. The MOS switch circuit 118, sometimes also known as metal-oxide-semiconductor field-effect transistor ("MOSFET") switch circuit, can be a circuit consisting of one or more MOS transistors. In some embodiments, the MOS switch circuit 118 can be an integrated circuit for switching on and/or off the individual cells 120.

Although shown and described as using MOS switch circuit 118 for purposes of illustration only, other suitable switch circuits can be used for switching the cells 120 on to and/or off from the intelligent battery 100.

FIG. 5 illustrates an exemplary embodiment of the intelligent battery 100, wherein a selected cell 120 has two electrode tabs 131, 132 for connecting two electrodes (not shown) of the cell 120 to one or more external connectors. In FIG. 5, the first electrode tab 131 can comprise any conductive material and can connect to cathodes of the electrodes to form a positive external connection of the cell 120. The second electrode tab 132 can connect to anodes of the electrodes of the cell 120 to form a negative external connection of the cell 120. The first and second electrode tabs 131, 132 each can be provided with any suitable geometry and can be planar with the surface 133, as shown in FIG. 5, and/or include one or more extensions from the surface 133. The first and second electrode tabs 131, 132 can be in any two-dimensional or three-dimensional shapes.

In FIG. 5, a terminal kit 115 can be provided for the cell 120. The terminal kit 115 can comprise one or more cooperating terminals, such a first terminal 111 for connecting with the first electrode tab 131 and a second terminal 112 for connecting with the second electrode tab 132. The first and second terminals 111, 112 can comprise any conductive material and can be in any suitable shapes. The shapes of the first and second terminals 111,112 can be determined based on shapes of adapters 161, 162 of a connection board (collectively Shown in FIG. 6). Such shapes can include, but are not limited to, a cylinder, an elliptic cylinder, a cube, a cuboid, a cone, a multilateral column and the like. The shapes of the first terminal 111 can be different from the shape of the second terminal 112. In some embodiments, the first and second terminals 111, 112 can be flat. When the first and second terminals 111, 112 are provided in flat shapes, their shapes can include, but are not limited to, round, oval, square, rectangle, polygon and the like. Stated somewhat differently, the first and second terminals 111, 112 can have any suitable shape for cooperating with the adapters 161, 162.

The first and second terminals 111, 112 can he provided with certain mechanisms to engage with the adapters 161, 162 of the. Such mechanisms can include, but are not limited to, magnetism and/or any applicable mechanical designs that can be used for securing a plug-in and/or a contact device. The first and second terminals 111, 112 can be made in suitable shapes to adapt the first and second electrode tabs 131, 132. In FIG. 5, the terminal adapters 161, 162 can be provided with an optional plate 113 for positioning the first and second terminals 111, 112 on the terminal kit 115. The plate 113 can be useful when the first and second terminals 111, 112 are flat for engaging with the adapters 161, 162 with, e.g., magnetism. In other embodiments, when the first and second terminals 111, 112 are provided in three-dimensional shapes, the plate 113 can be unnecessary.

Although shown and described as being two terminals 111,112 connecting two electrode tabs 131, 132 for purposes of illustration only, the cell 120 can have other connections, e.g. an earth connection for providing an earth protection.

The first and second terminals 111, 112 can connect with the electrode tabs 131, 132 in any suitable manner, including, but not limited to, welding, soldering, brazing and the like. Alternatively or additionally, the first and second terminals 111, 112 can connect with the electrode tabs 131, 132 in any suitable mechanical manner, e.g. ties, clips, spring mechanisms and the like.

FIG. 6 illustrates an exemplary embodiment of the BMS 110 of the intelligent battery 100 of FIG. 3. Turning to FIG. 6, the BMS can include a connection board 160 for coupling with the pack of cells 120. In FIG. 6, the connection board 160 of the BMS 110 can have a plurality of adapters 161, 162 for receiving the terminals 111, 112 of the cells 120. The connection board 160 can enable the BMS 110 to connect with the pack of cells 120. In FIG. 6, a total of seven pairs of adapters 161, 162 can be provided with seven first terminal adapters 161 and seven second terminal adapters 162. The first terminal adapters 161 can be configured to adapt the first terminals 111 of the cells 120 and the second terminal adapters 162 can be configured to adapt the second terminals 112. Stated somewhat differently, a selected pair of first and second terminal adapters 161A, 162A can adapt with the first and second terminals 111, 112, respectively, of a selected cell 120.

Although shown and described as comprising seven pairs of adapters for purposes of illustration only, the connection board 160 can have any predetermined number of adapters for adapting the predetermined number of the cells 120 to form the intelligent battery 100. Alternatively or additionally, the connection board 160 can have one or more pairs of spare (or unused) first adapters 161 and second adapters 162. The first adapters 161 and the second adapters 162 are shown and described as being same size and same shape for purposes of illustration and not for purposes of restriction. The shapes for the first and second terminal adapters 161, 162 can be in any suitable shapes for adapting the first and second terminals 111, 112 respectively. The first terminal adapters 161 can have a shape that is different from a shape of the second terminal adapters 162. In some embodiments, the adapters for connecting the cells 120 can be flat surfaces. In these embodiments, contacting areas of the connection board 160 optionally can be coated with conductive material for connecting with the cooperating terminals 111, 112 that can also be flat surface. The conductive coating can be advantageous, for example, if the connection board 160 provides limited contacting areas.

The connection board 160 can have a conductive circuit for forming desired parallel and/or serial connections of the cells 120. Each of the first adapters 161 can be designed to conductively connect with one first terminal 111 when the first terminal 111 is engaged with the adapter 161. Each of the second adapters 162 can be designed to conductively connect with one second terminal 112 when the second terminal 112 is engaged with the adapter 162. For purposes of conductively connection, at least part of each of the adapters 161, 162 can comprise conductive material for transmitting electric current to and/or from the cooperating terminals 112.

Holding mechanisms (not shown) cart be provided with the adapters 161, 162 to corporate with cooperating terminals 111, 112 in order to ensure good contact and reliable engagement between the adapters 161, 162 and the cooperating terminals 111, 112. In some embodiments, the holding mechanisms can be designed for easy releasing (or disengaging) the cell 120 from the connection board 160. The holding mechanisms advantageously can enable the connection board 160 to facilitate replacement of a selected cell 120 that is not effective or otherwise needs to be replaced by another cell 120. The cell 120 can be released by a simple pull and/or a push in some embodiments. In some other embodiments, the cell 120 can be released by first releasing the holding mechanism via a simple action and then disengaging from the connection board 160.

FIG. 7 illustrates another exemplary embodiment of the intelligent battery 100. Turning to FIG. 7, the intelligent battery 100 can be assembled within a housing 510. In FIG. 7, six cells 120 can be connected to (and/or engaged with) the connection board 160. The connection board 160 can have seven pairs of connection adapters 161, 162. As described herein, the chemical characteristics can be uniform and/or various among the cells 120. The cells 120 can have various parameters, including, but not limited to, various capacities, various voltage systems, various charge/discharge rates, various lifecycles, various internal resistance, and various protection parameters among the cells 120. The cells 120 can be held in place by the cooperating terminals 111, 112. Alternatively or additionally, there can be other mechanisms (not shown) provided for holding the cells 120 in place. When installed, the cells 120 form the pack of cells 120 of the intelligent battery 100.

In FIG. 7, each of the cells 120 can be engaged (or assembled) and/or disengaged (or disassembled) with the connection board 160. For example, after usage of the intelligent battery 100, the cells 120 can be disengaged for preservation and/or for transportation, The cells 120 can be engaged with the connection board 160 to assemble the intelligent battery 120 for use. In another example, when any of the cells 120 are to be replaced, one or more cells 120 can be disengaged, and new (or replacement) cells 120 can be engaged. When there is any change to any of the cells 120 engaged on the connection board 160, chemical characteristics of the cells 120 can be refreshed (or reloaded) to reflect the change of the cells 120.

Although shown and described as having six cells 120 for purposes of illustration only, the pack of cells 120 of the intelligent battery 100 can have any suitable number of cells 120 to form the battery 100 with a desired capacity.

In FIG. 7, the intelligent battery 100 can be provided with a BMS 110. As shown, and described with reference to FIG. 4, the BMS 110 can have a gas gauge 114, a microcontroller 116 and a MOS switch circuit 118. In some embodiments, the BMS 110 can be a separate piece connected to the connection hoard 160. In some alternative embodiments, the BMS 110 and the connection board 160 can be integrated into one piece for providing integrated management functionalities to the cells 120 and/or the intelligent battery 100.

FIG. 7 shows the connection board 160 for connecting the cells 120 together and for connecting the cells 120 with the BMS 110. The connection board 160 can have a desired number of connection adapters 161, 162 for adapting the pack of cells 120. Additionally or alternatively, the connection board 160 can connect other components with the BMS 110.

In FIG. 7, a housing 510 can enclose the pack of cells 120, the BMS 110 and the connection board 160 to form an enclosed intelligent battery 100, The housing 510 is shown as comprising two housing pieces 510A, 510B. The two housing pieces 510A, 510B can have certain venting mechanism (not shown) and certain engagement mechanism (not shown) for engaging them together. When engaged, the two housing pieces 510A, 510B can form the enclosed housing 510 with proper ventilation to the cells 120 and the BMS 110.

Alternatively or additionally, the housing 510 can be disengaged to restore the two housing pieces 510A, 510B. When disengaged, the two housing pieces 510A, 510B can be dissembled to make the cells 120 and the BMS 110 accessible for removal, addition, replacement and/or repair. Any of the cells 120 can be removed from the connection board 160 and replaced at any time. The removal and replacement can be for purposes of transportation, storage and/or services. The two housing pieces 510A, 510B can be engaged after operations to the cells 120 and/or the BMS 110.

Although shown and described as having the housing 510 with two pieces 510A, 510B for illustration purposes only, the intelligent battery 100 can have a housing of any shape and/or any structure for protecting the intelligent battery 100. The housing 510 can also include other components, e.g. a handle and an additional venting mechanism.

FIG. 8 illustrates an exemplary embodiment of a method 200 for manufacturing the intelligent battery 100. According to FIG. 8, a Battery Management System ("BMS") 110 is coupled with a pack of cells 120 to, provide a secondary protection. In FIG. 8, the pack of cells 120 can consist of a plurality of cells 120 that are connected to each other to form the core pack. The pack of cells 120 to form the core pack can he same and/or various types. When various, the cells 120 can have various parameters as shown and described with reference to FIG. 7. The pack of cells 120 can be connected with the BMS 110, at 610.

At 650, the BMS 110 can be enabled to provide secondary protection for the pack of cells 120. The secondary protection can include protection to the cells 120 and/or the battery 100. The BMS 110 can enabled via loading appropriate programs, relevant parameters of the cells 120 into the BMS 110 and via collecting operation parameters from the cells 120 and/or the intelligent battery 100.

Although shown and described as providing the secondary protection for purposes of illustration only, the BMS 110 can be enabled to provide other protection and functionalities of the pack of the cells 120 and/or the intelligent battery 100, such as smart charge and/or discharge functionality for protecting the pack of the cells 120.

FIG. 9 illustrates another exemplary embodiment of the method 200. Turning to FIG. 9, the method 200 is shown as optionally including enabling the pack of cells 120 with certain primary cell protection, at 630. The primary cell protection can include, but is not limited to, an over voltage protection, an over current protection and an over load protection. In some exemplary embodiments, such primary protection can be conducted via hardware configurations, e.g. a built-in protective switch, a fuse and the like.

Although shown and described as enabling the cells 120 with the primary cell protection for purposes of illustration only, the cells 120 can be enabled to have other suitable protections and/or functions.

FIG. 10 illustrates another exemplary alternative embodiment of the method 200. Turning to FIG. 10. the providing the secondary protection, at 650, can include installing a printed circuit board 115, a gas gauge 114, an MCU chip 116 and a MOS switch circuit 118. In FIG. 10, the printed circuit board 115 can be installed, at 651. As shown and described herein, the printed circuit board 115 can connect the gas gauge 114, the MCU chip 116 and the MOS switch circuit 118 to form the BMS 110 (shown in FIG. 4).

At 653, the gas gauge 114 can be installed by connecting to the printed circuit board 115. The gas gauge 114 can provide measurements of temperature, voltage, current, power volume and other parameters for managing or controlling the cells 120 and/or the intelligent battery 100. The gas gauge 114 can provide the parameters for each of the cells 120.

At 655, the MCU chip 116 can be installed for providing protection and calculation abilities of the cells 120 and the intelligent battery 110. The MCU chip 116 can connect to the printed circuit board 115 with the pins of the MCU chip 116 being either broken and/or unbroken. Chemical characteristics for each of the cells 120 can be loaded into a memory of the MCU chip 116 for managing the cells 120 separately and/or the intelligent battery 100 as a whole. The MCU chip 116 can conduct the management functions as shown and described with reference to FIG. 4.

At 657, the MOS switch circuit 118 can be installed for switching each cell 120 on and/or off. Each of the cells 120 can be connected by the MOS switch circuit 118. The MOS switch circuit 118 can connect the pack of cells 120 in parallel and/or serial manners to form proper configuration for power supply of the intelligent battery 100. Alternatively or additionally, the MOS switch circuit 118 can switch on or off each cell 120 for the gas gauge 114 to measure the parameters of the cell 120.

At 659, chemical characteristics of each of the cells 120 can be loaded to one of the gas gauge 114 and the MCU 116. The chemical characteristics can be acquired from manufacturers of the cells 120. As shown and described with reference to FIG. 3, the cells 120 can be from different manufactures, so the chemical characteristics can be from different manufacturers. The chemical characteristics can be used as bases for managing the cells 120 and/or the intelligent battery 100.

Although shown and described as installing the printed circuit board 115, the gas gauge 114, the MCU chip 116 and the MOS switch circuit 118 for purposes of illustration only, other suitable components can installed to form the intelligent battery 110. Alternatively or additionally, the steps 651-659 can be performed in any order, any combination, individually, and/or optionally.

FIG. 11 illustrates another exemplary alternative embodiment of the method 200. Turning to FIG. 11, connectors and/or cooperating terminals are provided between the pack of cells 120 and the BMS 110. In FIG. 11, one or more cooperating connectors can be provided, at 662, for the pack of cells 120.

Two optional types of cooperating connectors can be provided. The cooperating connectors can be provided with both the cells 120 and the BMS 110. At the cells 120, plug-in terminals for contacting electrode tabs of the cells 120 cart be provided, at 663. At the BMS 110, plug-in adapters for adapting the plug-in terminals can be provided, at 665. Shapes and sizes of the plug-in terminals and the plug-in adapters can be designed to let the plug-in terminals cooperate with the plug-in adapters.

In some other embodiments, magnetic terminals can be provided for the cells 120, at 664. Magnetic adapters can be provided for adapting the magnetic terminals, at 666. Shapes and sizes of the magnetic terminals and the magnetic adapters can be designed to let the magnetic terminals neatly fit with the magnetic adapters.

To ensure secured contact and reliable engagement between the cooperating terminals and the adapters, suitable secure mechanisms can be provided with the cooperating terminals and/or the adapters. Such mechanisms can include, but are not limited to, ties, clips, spring mechanisms and the like.

Although described as using plug-in type or magnetic type connectors for purposes of illustrations, other type of suitable connectors can be provided for connecting the cells 120 and the BMS 110.

FIG. 12 illustrates another exemplary alternative embodiment of the method 200. Turning to FIG. 12, an intelligent battery 100 can be activated by a learning process. In FIG. 12, the intelligent battery 100 can be activated, at 670. The intelligent battery 100 is activated to enter into an operational state. In some embodiments, the intelligent battery 100 can be activated by the learning process, at 672.

At 672, the learning process cat consist of at least one charge cycle and discharge cycle. At 676A, the intelligent battery 100 can be charged as a part of the learning process. A charge of the intelligent battery can be performed with a proper charger (not shown) of the intelligent battery 100. At 676B, the charged intelligent battery 100 can be discharged as a part of the learning process. The discharge of the intelligent batter 100 can be performed via connecting to certain power consumption device or other load (not shown). In some exemplary embodiments, the intelligent battery 100 can be charged in full, and the charged intelligent battery 100 can be discharged in full to complete a learning cycle. In other embodiments, the learning cycle can be repeated more than one time.

Although shown and described as activating the intelligent battery 120 via the charge and discharge cycles for purposes of illustration only, the intelligent battery 120 can be activated via other suitable learning process, such as a learning process consisting of a charging cycle or discharging cycle only.

FIG. 13 illustrates another exemplary alternative embodiment of the method 200. Turning to FIG. 13, the cells 120 of the intelligent battery 100 include two or more cells 120 with various characteristics for coupling with the BMS 110 to form the intelligent battery 100. In FIG. 13, at least two of the cells 120 can have various capacities. The cells 120 can be connected to each other and/or be coupled with the BMS 110, at 682, to form the intelligent battery 100 with a desired capacity. The cells 120 with various capacities can be grouped by the capacities. The cells 120 with same capacity can be grouped by, e.g., parallel connections and the parallel connected cells 120 can be connected either in a parallel or serial manner to acquire the desired capacity.

For example, the intelligent battery 100 can include a total of six cells 120, three of the cells 120 having a first capacity and the other three cells 120 having a second capacity. The three cells 120 with the first capacity can be connected to form a first group and the three cells 120 with the second capacity can be connected to form a second group. The fast and second groups of cells 120 can be connected to form a core pack for the intelligent battery 100.

In some embodiments, at least two of the cells 170 can have different charge rates. The cells 120 can be connected to each other and be coupled with the BMS 110, at 684 to fort the intelligent battery 100 with a desired charge rate. The cells 120 with same charge rate can be grouped by, e.g., parallel connections and the parallel connected cells 120 can be connected either in a parallel or serial manner to acquire the desired charge rate.

In some other embodiments, at least two of the cells 120 can have different discharge rates. The cells 120 can be connected to each other and be coupled with the BMS 110, at 686, to form the intelligent battery 100 with a desired discharge rate. The cells 120 with same discharge rate can be grouped by, e.g., parallel connections and the parallel connected cells 120 can be connected either in a parallel or serial manner to acquire the desired discharge rate.

In some other embodiments, at least two of the cells 120 can have different voltage systems. The cells 120 can be connected to each other and be coupled with the BMS 110, at 688, to form the intelligent battery 100 with a desired voltage system. The cells 120 with same voltage system can be grouped by, e.g., parallel connections and the parallel connected cells 120 can he connected either in a parallel or serial manner to acquire the desired voltage system.

In some other embodiments, at least two of the cells 120 can have various lifecycles. The cells 120 can be connected to each other and be coupled with the BMS 110, at 689, to form the intelligent battery 100 with a desired lifecycle. The cells 120 with same lifecycle can be grouped by, e.g., parallel connections and the parallel connected cells 120 can be connected either in a parallel or serial manner to acquire the desired lifecycle.

Although shown and described as at least two of the cells 120 with various capacities, various charge rates, discharge rates, voltage systems and various lifecycles for purposes of illustration only, the cells 120 with one or more various parameters can be coupled with the BMS 110 to form the desired intelligent battery 100. Alternatively or additionally, the steps 682-689 can be performed in any order, any combination, individually, and/or optionally.

The described embodiments are susceptible to various modifications and alternative forms, and specific examples thereof have been shown by way of example in the drawings and. are herein described in detail. It should be understood, however, that the described embodiments are not to be limited to the particular forms or methods disclosed, but to the contrary, the present disclosure is to cover all modifications, equivalents, and alternatives.

What is claimed is:

1. A battery management system ("BMS"), comprising:
a metal-oxide-semiconductor ("MOS") switch circuit;
a connection board coupled with each of a pack of cells, the MOS switch circuit being configured to, through the connection board, switch on/off each of the pack of cells; and
one or more processors, individually or collectively, configured to:
obtain at least one property of the pack of cells;
update at least one controlling parameter of the BMS, based on the property, for protecting the pack of cells; and
in response to the updated at least one controlling parameter, control the MOS switch circuit to switch on/off at least one selected cell of the cells to form a first portion of the cells in a parallel connection and/or a second portion of the cells in a serial connection to obtain at least one of a desired capacity, a desired charge rate, a desired discharge rate, a desired voltage system, or a desired lifecycle of the pack of cells.

2. An intelligent battery, comprising:
a pack of cells; and
a battery management system ("BMS") including a metal-oxide-semiconductor ("MOS") switch circuit and a connection board;
wherein:
the connection board is configured to couple with each of the pack of cells to enable the BMS to obtain at least one property of the pack of cells and the BMS is configured to update at least one controlling parameter of the BMS based on the property of the cells; and
the MOS switch circuit is configured to, through the connection board, switch on/off each of the pack of cells and in response to the updated at least one controlling parameter, the MOS switch circuit is further configured to switch on/off at least one selected cell of the cells to form a first portion of the cells in a parallel connection and/or a second portion of the cells in a serial connection to obtain at least one of a desired capacity, a desired charge rate, a desired discharge rate, a desired voltage system, or a desired lifecycle of the pack of cells.

3. The intelligent battery of claim 2, wherein the pack of cells provides primary battery protection for the cells, and wherein the BMS provides secondary protection for the cells.

4. The intelligent battery of claim 2, wherein the BMS is adapted to releasably couple with the pack of cells.

5. The intelligent battery of claim 4, further comprising at least one first storage device for storing a plurality of predetermined properties of the pack of cells.

6. The intelligent battery of claim 5, further comprising one or more processors that are configured to recognize a type of each of the cells and elect the predetermined properties based on the type.

7. The intelligent battery of claim 4, wherein each of the cells comprises a second storage device configured to store the property of the cell.

8. The intelligent battery of claim 6, wherein each of the processors is configured to obtain the property of the cell when the processor is coupled with the cell.

9. The intelligent battery of claim 2, further comprising:
an interface for communicating with the BMS and comprising one or more cooperating terminals for releasably coupling the BMS with the pack of cells.

10. The intelligent battery of claim 2, wherein at least one of the cells is replaceable.

11. The intelligent battery of claim 10, wherein each of the cells is replaceable.

12. The intelligent battery of claims 2, wherein at least one of the cells is detachable from the BMS.

13. The intelligent battery of claim 12, wherein each of the cells is detachable from the BMS.

14. The intelligent battery of claim 13, wherein each of the cells is detachable by unplugging the relevant cell from the BMS.

15. A method for manufacturing an intelligent battery, comprising:
configuring a battery management system ("BMS") to obtain at least one property of a pack of cells through a connection board coupled with each of the pack of cells, and update at least one controlling parameter of the BMS based on the property of the cells,
wherein:
the BMS includes a metal-oxide-semiconductor ("MOS") switch circuit and the connection board, and
the MOS switch circuit is configured to, through the connection board, switch on/off each of the pack of cells; and
in response to the updated at least one controlling parameter, controlling the MOS switch circuit to switch on/off at least one selected cell of the cells to form a first portion of the cells in a parallel connection and/or a second portion of the cells in a serial connection to obtain at least one of a desired capacity, a desired charge rate, a desired discharge rate, a desired voltage system, or a desired lifecycle of the pack of cells.

16. The method of claim 15, further comprising:
activating the intelligent battery through a learning process.

17. The method of claim 15, further comprising:
reconfiguring the BMS when one or more of the cells are replaced or a number of the cells is changed.

18. The method of claim 15, further comprising:
changing at least one of a chemical characteristic of the pack of cells, a number of the cells, a type of the cells, an electrical connection between the cells, or a status of the cells.

19. The method of claim 15, further comprising:
updating at least one of a battery parameter, a protection parameter, a voltage level, a current level, a power level, a lifecycle, or a temperature level.

* * * * *